(12) United States Patent
Higgins

(10) Patent No.: US 10,920,371 B1
(45) Date of Patent: Feb. 16, 2021

(54) FLOOR COVERING

(71) Applicant: Higgins Research & Development, LLC, LaGrange, GA (US)

(72) Inventor: Kenneth B. Higgins, LaGrange, GA (US)

(73) Assignee: HIGGINS RESEARCH & DEVELOPMENT, LLC, LaGrange, GA (US)

( * ) Notice: Subject to any disclaimer, the term of this patent is extended or adjusted under 35 U.S.C. 154(b) by 0 days.

(21) Appl. No.: 17/028,089

(22) Filed: Sep. 22, 2020

Related U.S. Application Data

(63) Continuation-in-part of application No. 16/781,509, filed on Feb. 4, 2020.

(51) Int. Cl.
*A47G 27/02* (2006.01)
*B32B 27/12* (2006.01)
(Continued)

(52) U.S. Cl.
CPC .......... *D06N 7/0068* (2013.01); *A47G 27/02* (2013.01); *B05C 3/18* (2013.01); *B05D 1/42* (2013.01); *B32B 7/12* (2013.01); *B32B 27/12* (2013.01); *D06N 7/0065* (2013.01); *D06N 7/0071* (2013.01); *D06N 7/0081* (2013.01);
(Continued)

(58) Field of Classification Search
CPC .. A47G 27/02; B05C 1/04; B05C 1/08; B05C 1/0804; B05C 1/0808; B05C 1/0813; B05C 1/0826; B05C 1/086; B05C 1/0869; B05C 1/14; B05C 3/18; B05C 11/023; B05C 11/025; B05C 11/026; B05C 11/028; B05D 1/40; B05D 1/42; B32B 5/18; B32B 5/245; B32B 5/26; B32B 7/12; B32B 27/12; B32B 37/1284; B32B 37/24; B32B 2037/243; B32B 2038/0072; B32B 2471/02; D05C 17/02; D06N 7/0065; D06N 7/0068; D06N 7/0071; D06N 7/0073; D06N 7/0076; D06N 7/0078; D06N 7/0081; D06N 7/0086; D06N 2205/14; D06N 2211/066; D06N 2213/03; D06N 2213/065; D06N 2213/066; D10B 2503/01; D10B 2503/042; Y10T 428/23979; Y10T 428/23986; Y10T 428/23993
See application file for complete search history.

(56) References Cited

U.S. PATENT DOCUMENTS 6,162,309 A * 12/2000 Brodeur, Jr. ....... A47G 27/0475
156/72
9,339,136 B2 5/2016 Higgins
(Continued)

*Primary Examiner* — Michael A Tolin
(74) *Attorney, Agent, or Firm* — Hammer & Associates, P.C.

(57) ABSTRACT

A one step method for integrally attaching a backing cover to a universal fiber-reinforced backing before curing. The manufacturing method includes attaching a porous cover to a reinforcement configuration of fibers and adhesive before curing. The cover is pressed against the fibers and adhesive for compressing, collapsing, and flattening the ends of the stitch portions. The compressing and collapsing actions cause adhesive and fibers to be directed toward and forced into the porous cover. Adhesive and reinforcement fibers provide an integral attachment of the cover to the reinforced backing before and after curing.

3 Claims, 4 Drawing Sheets

(51) Int. Cl.
*B32B 38/00* (2006.01)
*B32B 7/12* (2006.01)
*D06N 7/00* (2006.01)
*B05D 1/42* (2006.01)
*B05C 3/18* (2006.01)

(52) U.S. Cl.
CPC ... *B32B 2038/0072* (2013.01); *B32B 2471/02* (2013.01); *D06N 2205/14* (2013.01); *D06N 2211/066* (2013.01); *D06N 2213/066* (2013.01); *D10B 2503/042* (2013.01); *Y10T 428/23979* (2015.04); *Y10T 428/23986* (2015.04)

(56) References Cited

U.S. PATENT DOCUMENTS

| | | |
|---|---|---|
| 9,506,175 B2 | 11/2016 | Higgins |
| 9,681,768 B2 | 6/2017 | Higgins |
| 9,775,457 B2 | 10/2017 | Higgins |
| 9,924,820 B2 | 3/2018 | Higgins |
| 9,926,657 B2 | 3/2018 | Higgins |
| 10,132,019 B2 | 11/2018 | Higgins |
| 10,501,878 B2 | 12/2019 | Higgins |
| 2005/0053760 A1* | 3/2005 | Fowler .............. D06N 7/0081 428/95 |
| 2014/0158276 A1* | 6/2014 | Higgins ............. D06N 7/0073 156/60 |
| 2017/0089007 A1* | 3/2017 | Higgins ............. D06N 7/0073 |

\* cited by examiner

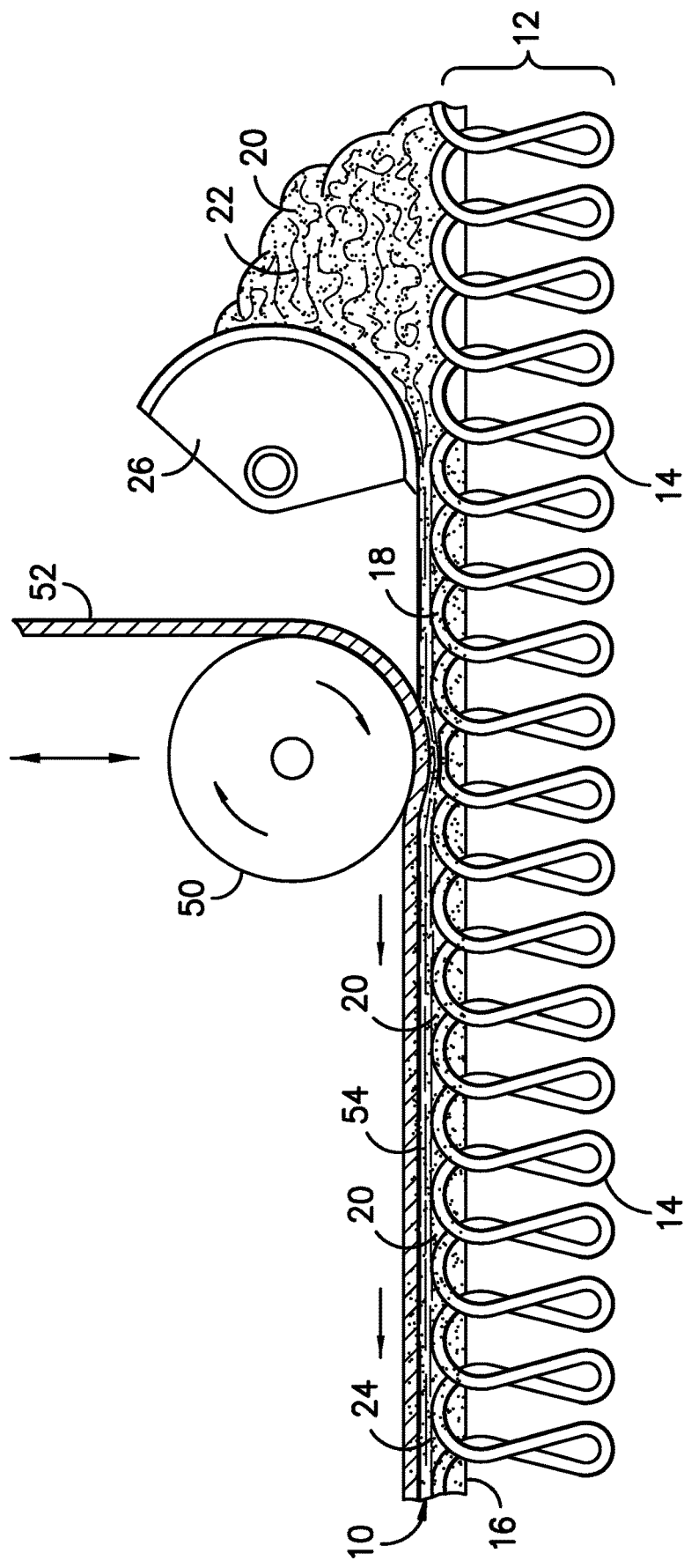
FIG. -1-

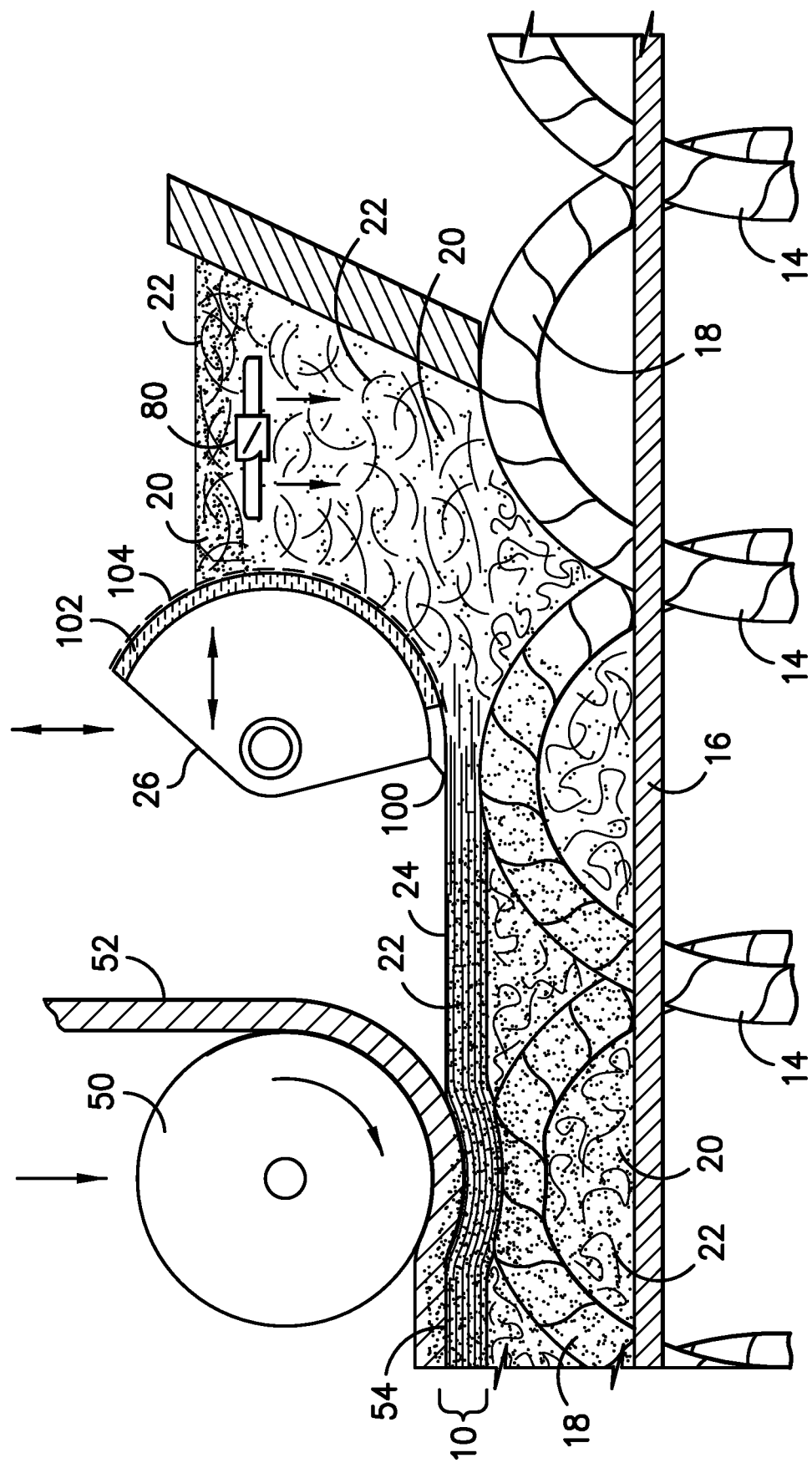
FIG. -2-

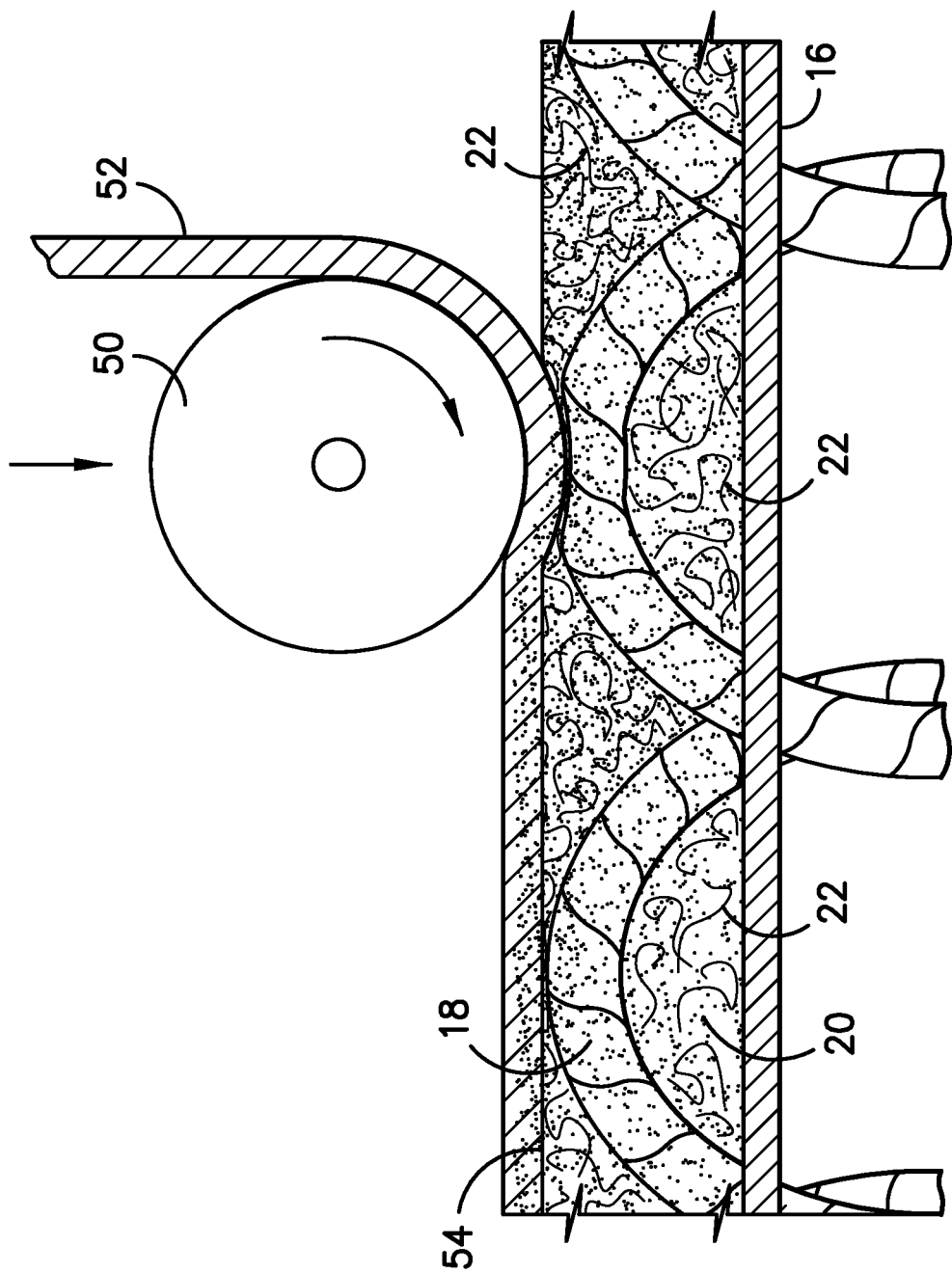
FIG. -3A-

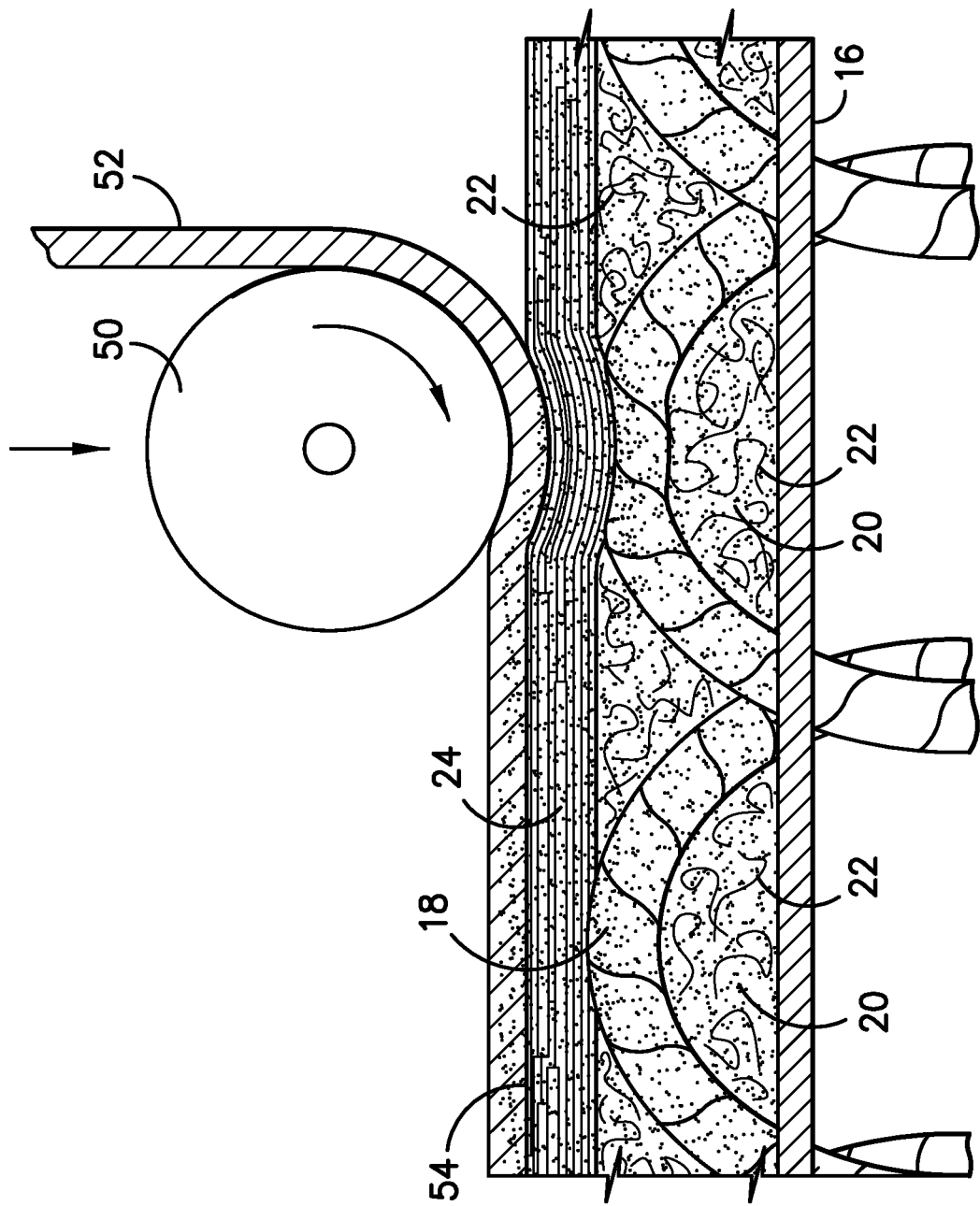
FIG. -3B-

FLOOR COVERING

CROSS REFERENCE TO RELATED APPLICATION

The present application is a continuation-in-part of and claims priority to co-pending U.S. application Ser. No. 16/781,509, which was filed Feb. 4, 2020.

TECHNICAL FIELD

The present disclosure is directed to the field of textile floor coverings, such as broadloom carpet and modular carpet tiles, and particularly to a universal textile floor covering having a fiber-reinforced backing system that is integrally attached to a backing cover. More particularly, according to one or more aspects provided herein, the present disclosure is directed to a one pass method for integrally attaching a backing cover to a universal backing system before curing.

BACKGROUND

With the advent of tufting equipment, floor covering evolved over time from woven carpet to the tufted carpets in use today. Machine tufting began with a single needle which was similar to a sewing machine. A needle carries a yarn through a primary backing substrate, which forms a stitch on the back side adjacent to the primary backing substrate. On the face side, a looper holds the yarn to a specified height above the primary backing substrate to form the pile of the carpet. The tufted yarns and the primary backing substrate collectively are referred to as a tufted textile substrate.

The single needle configuration progressed to multiple needles operating side-by-side, which is how tufted carpets are made currently. Tufting widths of up to sixteen feet are possible with this equipment, and when sold at these widths, these carpets are referred to in the industry as "broadloom" carpets. This type of carpet is the preferred flooring material for today's residential homes and commercial buildings.

"Modular" carpet products (carpet tiles) were introduced to address some of the problems encountered with the broadloom carpet product. Because individual tiles of an installation can be removed and replaced when soiled or worn, modular carpets were useful in applications where broadloom carpets were impractical, such as offices, airports, and other high-traffic areas.

Both broadloom and tile carpet designs have faced challenges and issues with stability. Without a separate reinforced floor covering and/or one or more secondary backing layers, the broadloom carpet design has the tendency to "creep" which leads to undesirable growth. Modular tiles with their heavy backing layers are stiff. As a result, there is a tendency for the modular tiles to cup or curl. Other challenges for modular tiles and broadlooms occur because of issues relating to thickness and weight variation. The manufacturers of floor coverings have significant material costs and manufacturing expenses associated with the processing and attachment of multiple backing layers and/or preformed reinforcement layers to the textile substrates.

With respect to stability, it is known in the carpet industry that the machine direction of a carpet is the greatest contributor to dimensional stability problems. The "machine direction" is considered to be the direction in which the yarn is tufted. The yarns, which form a continuous series of loops in the machine direction, are inherently unstable especially when exposed to heat and/or moisture. Additionally, the primary backing substrates of the floor covering tend to experience more shrinkage in the machine direction. Thus, the machine direction is almost always the more unstable direction of the floor covering.

While related patents, identified herein, disclose universal carpets having reinforcing backing layers and methods for making the universal carpets, the present application discloses improvements to the universal carpet inventions disclosed in the related patents.

The invention set forth herein is related to U.S. Pat. Nos. 9,339,136, 9,506,175, 9,681,768, 9,775,457, 9,924,820, 9,926,657, 10,132,019, and 10,501,878, each of which is incorporated herein by reference.

SUMMARY

The present invention includes a floor covering with a universal fiber-reinforced backing. The floor covering may be used in broadloom products or any of a variety of modular products. The manufacturing method and resulting product include a tufted textile substrate having a primary backing substrate and a plurality of yarns tufted through the primary backing substrate. The primary backing substrate includes a face side and a back side that is opposite to the face side with a portion of each yarn forming a stitch that is located on the back side of the primary backing substrate. Each stitch portion includes an end, and the stitch portions are separated by spaces.

The manufacturing method and resulting product disclosed herein includes a one pass method for attaching a porous cover to a desired configuration of reinforcement fibers and adhesive. In one embodiment, the reinforcement fibers and adhesive are mixed and formed into a layer of reinforcement fibers and adhesive that is located in the stitch portions and in the spaces between the stitch portions. The reinforcement fibers and adhesive may also be formed into a configuration including a separate layer of laminated reinforcement fibers that is attached to a layer of adhesive. Further, the reinforcement fibers and adhesive may be formed into a configuration including a layer of laminated fibers that is joined to a layer of reinforcement fibers and adhesive. Each embodiment of the invention includes a step of forcing adhesive into the stitch portions and into the spaces between the stitch portions, before the porous cover is attached by the one pass method to the desired configuration of reinforcement fibers and adhesive.

The manufacturing process begins by forming a pool of conditioned reinforcement fibers and adhesive, and directing the conditioned pool of reinforcement fibers and adhesive towards a first applicator. Pressure is applied in a controlled manner by the first applicator against the pool of reinforcement fibers and adhesive. The adhesive is forced into the stitch portions, and into the spaces between the stitch portions, to form a layer of adhesive that is located between the ends of the stitches and the primary backing substrate. The layer of adhesive acts as a barrier and a cushion within the space separating the ends of the stitches from the primary backing substrate.

As disclosed in the related patents identified herein, the reinforcement fibers and adhesive may be formed into different configurations for the purpose of providing dimensional stability. For each of the configurations, the amount or volume of the adhesive is more than the amount or volume of the reinforcement fibers. The present invention begins with filling the stitch portions, and the spaces between the stitch portions, with adhesive, so that there is excess adhesive available for an attaching function.

After the positioning of the reinforcement fibers and adhesive into a desired configuration, and before curing, a second applicator presses an absorbing, porous cover against the configured reinforcement fibers and adhesive. The second applicator presses the porous cover in a direction that is toward the primary backing substrate. The pressure applied by the second applicator is controlled such that the porous cover presses and compresses the reinforcement fibers and adhesive in a direction that is toward the primary backing substrate. A portion of the reinforcement fibers and adhesive is compressed and the ends of the stitches are simultaneously collapsed in response to the controlled pressure applied by the second applicator against the porous cover.

The compressing and collapsing actions force a portion of the adhesive to move in an opposite direction, away from the primary backing substrate, and a part of the adhesive is then directed into a contacting surface of the cover. The compressing and collapsing actions, in one direction, cause the forcing of adhesive, in an opposite direction, into the cover for securing the cover to the fiber and adhesive reinforcement layer. The pressure applied by the second applicator controls the amount and depth of adhesive that is forced into and absorbed by the cover. After the cover is secured to the fiber and adhesive reinforcement layer, the floor covering may be cured.

The ends of the stitch portions are flattened when the second applicator presses the porous cover in a direction that is towards the primary backing substrate. This forces a selected portion of the adhesive, that was within the stitch portions and within the spaces between the stitch portions, to move, in an opposite direction, into the porous cover. The amount of flattening of the stitch portions is controlled, which also controls the amount of adhesive that is forced into the porous cover.

The simultaneous compressing and flattening forces, in a direction towards the primary backing substrate, causes a simultaneous opposing reaction force, in a direction away from the primary backing substrate. The opposing reaction force causes a selected portion of adhesive to move into the porous cover. The selected portion of adhesive is forced to move in the direction of less resistance because the layer of adhesive and reinforcement fibers acts as a barrier against movement, of the selected portion of adhesive, towards the primary backing substrate.

When the selected portion of the adhesive is forced into the porous cover, the porous cover prevents all or a substantial portion of the reinforcement fibers, that are within the selected portion of the adhesive, from moving into the porous cover. All or at least a substantial portion of the reinforcement fibers, that are within the selected portion of the adhesive, are forced to attach to the porous cover, as a result of the lamination of the reinforcement fibers to the porous cover. Portions of some reinforcement fibers are also forced into the openings within the porous cover. The lamination of reinforcement fibers to the porous cover and the forcing of fiber portions into the porous cover, provide an integral attachment of the porous cover to the universal backing system.

The present invention provides a one pass, pre-curing manufacturing method and resulting product that results in a floor covering having a covered fiber and adhesive reinforcement configuration. After curing, the covered floor covering may be cut and rolled without the need for additional coating or manufacturing steps. The manufacturing method and resulting product disclosed herein provides dimensional stability to the floor covering, simplification of the manufacturing process, and a reduction in costs by avoiding the requirement for installing pre-formed layers after curing.

These and other features and advantages of the present invention will be better understood with reference to the following description and appended claims. The accompanying drawings, which constitute a part of the present specification, illustrate various embodiments of the invention, and together with the written description, serve to explain the principles of the inventive method.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic diagram of an equipment arrangement for attaching a fiber and adhesive reinforcement composition to a tufted textile substrate and for attaching an absorbing cover to the fiber and adhesive reinforcement composition.

FIG. 2 is a schematic diagram illustrating a first applicator for forming fiber and adhesive layers and a second applicator for attaching a cover to the fiber and adhesive layers.

FIG. 3A is a schematic diagram showing one embodiment including the second applicator and illustrating the compressing and collapsing of fibers and the tufted textile stitches.

FIG. 3B is a schematic diagram showing another embodiment including the second applicator and illustrating the compressing and collapsing of fibers and the tufted textile stitches.

DETAILED DESCRIPTION

Reference will now be made to embodiments of the present invention, examples of which are illustrated in the drawings. Each example is provided by way of explanation of the invention and not a limitation of the invention. It will be apparent to one of ordinary skill in the art that various modifications and variations can be made in the present invention without departing from the scope or spirit of the invention. Thus, it is intended that the present invention covers such modifications and variations as fall within the scope of the appended claims and their equivalents.

The present invention is directed to a one pass method for integrally attaching a backing cover to a universal backing system before curing.

FIG. 1 is a schematic diagram of one embodiment of the present invention. FIG. 1 illustrates an arrangement for applying adhesive 20 and reinforcement fibers 22 to a tufted textile substrate 12 to form a universal reinforcement backing layer 10. The reinforcement backing layer 10 may be used for both broadloom and modular floor coverings.

The floor covering illustrated in FIG. 1 includes a tufted textile substrate 12 made of yarns 14 that are tufted through a primary backing substrate 16 in the machine direction. As is known, the primary backing substrate 16 and tufted textile substrate 12 have a face side and a back side that is opposite to the face side. The yarns 14 form stitches 18 on the back side of the primary backing substrate 16, and an interstitial space exists between each yarn stitch 18.

The reinforcement backing layer 10, that is illustrated in FIG. 1, contains a layer of adhesive 20 and a separate layer 24 of reinforcement fibers 22. The method of manufacturing the embodiment, that is illustrated in FIG. 1, produces a laminated fiber layer 24 that is spaced from the back side of the tufted textile substrate 12.

The tufted textile substrate 12 is moved relative to a first applicator 26, as schematically shown in FIG. 1. A composition pool, including a mixture of conditioned adhesive 20 and reinforcement fibers 22, is moved into a space between the stitches 18 and the applicator 26. Pressure is applied in a controlled manner by the applicator 26 towards the tufted textile substrate 12 for moving the conditioned adhesive 20 and fiber 22 pool in a direction that is toward the back side of the primary backing substrate 16.

As shown in FIG. 1, and disclosed in the related patents identified previously, the controlled movement of the tufted textile substrate 12 in a first direction, i.e., the machine direction, and the controlled application of pressure by the applicator 26, causes the alignment of individual reinforcement fibers 22 into a reinforcement layer 24 of fibers that is substantially parallel to the machine direction.

FIG. 1 illustrates the formation of a layer 24 of reinforcement fibers 22 with the layer 24 of reinforcement fibers being attached to the ends of the stitches 18. During the forming process, adhesive 20 is directed into the stitches 18 and into the spaces between the stitches 18. A layer of adhesive 20 is formed between the layer 24 of fibers 22 and the primary backing substrate 16. After curing, the reinforcement layers of fibers 22 and adhesive 20 provide dimensional stability to the entire floor covering.

After the formation of the fiber reinforcement layer 24, and before curing, a second applicator 50 presses an absorbing, porous cover 52 in a direction that is toward the primary backing substrate 16. The pressure applied by the second applicator 50 is controlled such that the porous cover 52 engages the reinforcement layer of fibers 24.

The porous cover 52 is made of a filtering material that has spaces through which adhesive 20 may pass into the filtering material. The spaces in the porous cover 52 are sized to minimize or prevent the reinforcement fibers 22, or portions of the reinforcement fibers 22, from passing into the spaces in the porous cover 52.

As shown in FIG. 1, the controlled pressure applied by the second applicator 50 and cover 52, against the layer of reinforcement fibers 24, compresses the fiber layer 24 and the ends of the stitches 18. The controlled pressure also simultaneously collapses and flattens the ends of the stitches 18. The simultaneous compressing, collapsing, and flattening actions are controlled to force a portion of the adhesive 20 to move in an opposite direction into the contacting surface 54 of the absorbing cover 52. The adhesive 20 that is forced into cover 52 is used to both initially secure and then later, after curing, attach the absorbing, porous cover 52 to the layer of fibers 24.

FIG. 2 and FIG. 3B illustrate another embodiment and configuration of reinforcement fibers 22 and adhesive 20. In this embodiment, a layer of laminated reinforcement fibers 24 is joined to a layer of reinforcement fibers 22 and adhesive 20. The crescent shaped applicator 26 includes a removable tip portion 100 on one end of a curved engagement surface. Element 102 provides a slip path along the engagement surface. The slip path is located between the applicator 26 and the mixture of adhesive 20 and fibers 22. Layer 104 is made by element 102 for separating the moving mixture of adhesive 20 and fibers 22 from frictional contact with the engagement surface of the applicator 26.

A mixer and pressure controller 80 is operated to move adhesive 20 and fibers 22 into and around the stitch portions 18 at the same time that the applicator 26 is applying pressure in a controlled manner for forcing adhesive 20 and fibers 22 toward the back side of the primary backing substrate 16. This results in the contemporaneous or simultaneous formation of a fiber layer 24 and the formation of a mixture of reinforcement fibers 22 and adhesive 20 in the spaces between the stitch portions 18.

After the formation of the fiber reinforcement layer 24 and a layer of fibers 22 and adhesive 20, the second applicator 50 presses the porous cover 52 in a direction that is towards the primary backing substrate 16. Like the embodiment illustrated in FIG. 1, the pressure that is applied by the second applicator 50 is controlled such that the absorbing, porous cover 52 engages and presses against the fiber reinforcement layer 24. The controlled pressure from the second applicator 50 compresses the reinforcement fiber layer 24 and the ends of the stitches 18. The controlled pressure from the second applicator 50 also simultaneously collapses and flattens the ends of the stitch portions 18. The simultaneous compressing, collapsing, and flattening actions cause a pre-determined amount of adhesive 20 to be forced in an opposite direction into the contacting surface 54 of the porous cover 52. As with the embodiment illustrated in FIG. 1, the adhesive 20, that is directed into the porous cover 52, is used to attach the cover 52 to the layer of fibers 24.

FIG. 3A illustrates another configuration and embodiment of reinforcement fibers 22 and adhesive 20, where a layer of reinforcement fibers 22 and adhesive 20 is located within and between the stitches 18. Like the previously described embodiments, adhesive 20 is forced into the stitch portions 18 and into the spaces between the stitch portions 18. For each of the embodiments described herein, adhesive 20 is forced into the stitch portions 18, and into the spaces between the stitch portions 18, to form a layer of adhesive 20 that is located between the ends of the stitches 18 and the primary backing substrate 16. The layer of adhesive 22 acts as a barrier and a cushion for the space that separates the ends of the stitch portions 18 from the primary backing substrate 16.

The configuration, shown in FIG. 3A, also includes the second applicator 50 for pressing the cover 52 in a direction that is toward the primary backing substrate 16. The pressure applied by the second applicator 50 is controlled such that the porous cover 52 engages the fiber and adhesive layer that is formed in and between the stitches 18. The controlled pressure from the second applicator 50 compresses the fiber and adhesive layer and the ends of the stitches 18. The controlled pressure from the second applicator 50 also simultaneously collapses and flattens the ends of the stitch portions 18. The compressing, collapsing, and flattening actions force a portion of the adhesive 20 to move in an opposite direction into the porous cover 52 for securing the cover 52 to the layer of fibers 22 and adhesive 20. After the cover 52 is secured to the fiber and adhesive layer, the floor covering may be cured thereby attaching the cover 52 to the layer of fibers and adhesive.

As described, the ends of the stitch portions 18 are flattened when the second applicator 50 presses the porous cover 52 in a direction that is toward the primary backing substrate 16. The flattening action forces a selected portion of the adhesive 20, that is in the ends of the stitch portions 18 and in the spaces between the stitch portions 18, to move, in an opposite direction, into the porous cover 52. The amount of flattening controls the amount of adhesive that is selectively moved, in the opposite direction, from the stitch portions 18 and from the spaces between the stitch portions 18. The pressure applied by the second applicator controls the amount and depth of adhesive that is forced into the porous cover 52.

The simultaneous compressing, collapsing, and flattening forces are in a direction towards the primary backing substrate 16. An opposing reaction force, in a direction away from the primary backing substrate 16, is simultaneously caused by the resistive force from the layer of adhesive 20 and reinforcement fibers 22 that is located between the ends of the stitches 18 and the primary backing substrate 16. The layer of adhesive 20 and reinforcement fibers 22 acts as a barrier to block or prevent the movement of the selected portion of adhesive toward the primary backing substrate 16.

The opposing reaction force causes a selected portion of the adhesive 20 to move toward and into the porous cover 52. The selected portion of adhesive 20 is forced to move in the direction of less resistance because the layer of adhesive 20 and reinforcement fibers 22 acts as a barrier against movement, of the selected portion of adhesive 20, towards the primary backing substrate 16.

When the selected portion of the adhesive 20 is forced into the porous cover 52, the porous cover 52 prevents all or a substantial portion of the reinforcement fibers 22, that are within the selected portion of the adhesive 20, from moving into the porous cover 52. All or at least a substantial portion of the reinforcement fibers 22, that are within the selected portion of the adhesive 20, are forced into attachment with the porous cover 52. The opposing reaction force causes the lamination of reinforcement fibers 22 to the porous cover 52. Portions of some reinforcement fibers 22 are also forced into the openings within the porous cover 52.

The lamination of the reinforcement fibers 22 to the porous cover 52, and the forcing of fiber portions into the openings within the porous cover 52, provide an integral attachment of the porous cover 52 to the layer of reinforcement fibers 22 and adhesive 20. As used herein, "integrally attaching" means the physical joining of discrete parts together as a unit without each part losing its own separate identity.

The method disclosed herein uniquely directs a portion of excess adhesive into the porous cover 52, and, as described herein, causes the porous cover 52 to be integrally attached to the fiber and adhesive backing system.

The directing of excess adhesive 22 toward the cover 52 is caused by compressing, collapsing, and flattening actions, in one direction, and an opposing reaction force, in the opposite direction. The opposing reaction force causes a selected portion of the excess adhesive to be forced into the porous cover 52. When the selected portion of the adhesive is forced into the porous cover 52, reinforcement fibers 22 are also laminated to the cover 52, and fiber portions are forced into and connected with openings in the porous cover 52. Thus, the present invention provides a one pass method which causes a backing cover to be integrally attached to a universal backing system before curing.

The present invention may be embodied in other forms without departing from the spirit and the essential attributes thereof, and, accordingly, reference should be made to the appended claims, and not just to the foregoing specification, as indicative of the scope of the invention.

What is claimed is:

1. A method of manufacturing a floor covering, the method comprising the steps of:
    manufacturing the floor covering from a group of components including a tufted textile substrate having a primary backing substrate extending in a first direction, a plurality of yarns tufted through the primary backing substrate, the primary backing substrate having a face side and a back side opposite to the face side, a portion of each yarn forming a stitch portion, with each stitch portion having an end that is located on the back side of the primary backing substrate, and spaces existing between the stitch portions;
    said group of components further including a composition pool having adhesive and reinforcement fibers;
    moving the tufted textile substrate relative to a first applicator having an engagement surface, and initially providing space between the stitch portions of the yarns and the first applicator;
    mixing the composition pool of adhesive and reinforcement fibers;
    applying controlled pressure with the first applicator in a second direction that is toward the primary backing substrate;
    forming a reinforcement structure including reinforcement fibers and adhesive between the first applicator and the back side of the primary backing substrate; forming said reinforcement structure by positioning the reinforcement fibers into a desired configuration of reinforcement fibers and filling the stitch portions with the adhesive and filling the spaces between the stitch portions with the adhesive and with the reinforcement fibers;
    applying controlled pressure against one side of a porous cover with a second applicator; pressing the porous cover in the second direction towards the primary backing substrate; and pressing a contacting surface of the porous cover into engagement with the reinforcement structure;
    compressing the reinforcement structure in the second direction; simultaneously collapsing and flattening the ends of the stitch portions in the second direction and causing an opposing reaction force in a third direction that is opposite to the second direction; simultaneously forcing, with the opposing reaction force, a selected portion of the adhesive, that is within the stitch portions and within the spaces between the stitch portions, to move in the third direction; forcing, with the opposing reaction force, a part of the selected portion of the adhesive to move in the third direction into the contact surface of the porous cover; preventing reinforcement fibers from passing through the porous cover;
    controlling the flattening of the ends of the stitch portions and controlling the part of the selected portion of the adhesive that is forced into the contact surface of the porous cover;
    integrally attaching the porous cover to the reinforcement structure by directing the opposing reaction force against a second side of the porous cover, laminating a portion of the reinforcement fibers to the contact surface of the porous cover, and forcing portions of some reinforcement fibers into the porous cover; and curing the adhesive.

2. The method of manufacturing a floor covering according to claim 1 further comprising forming a part of the reinforcement structure as a mixture of adhesive and reinforcement fibers, forming another part of the reinforcement structure as laminated reinforcement fibers that are operatively connected to the ends of the stitch portions; and forcing the part of the selected portion of the adhesive to move through the laminated reinforcement fibers of the reinforcement structure into the contact surface of the porous cover.

3. The method of manufacturing a floor covering according to claim 1 further comprising forming a part of the reinforcement structure as a layer of reinforcement fibers that is operatively connected to the ends of the stitch portions.

\* \* \* \* \*